United States Patent [19]

Sasaki et al.

[11] Patent Number: 5,602,223
[45] Date of Patent: Feb. 11, 1997

[54] ETHYLENE-α-OLEFIN COPOLYMER AND A MOLDED ARTICLE THEREFOR

[75] Inventors: Toshio Sasaki, Ichihara; Kohzoh Miyazaki, Sodegaura; Hiroyuki Shiraishi, Sodegaura; Yuji Shigematsu, Ichihara; Hirofumi Johoji, Ichihara; Akio Uemura, Ichihara; Yufu Sato, Ichihara, all of Japan

[73] Assignee: Sumitomo Chemical Company, Limited, Osaka, Japan

[21] Appl. No.: 611,018

[22] Filed: Mar. 5, 1996

Related U.S. Application Data

[63] Continuation of Ser. No. 357,785, Dec. 16, 1994, abandoned, which is a continuation of Ser. No. 118,266, Sep. 9, 1993, abandoned.

[30] Foreign Application Priority Data

Sep. 10, 1992 [JP] Japan ................... 4-241749

[51] Int. Cl.$^6$ ................... C08F 210/02
[52] U.S. Cl. ................... 526/348.1; 526/348.2; 526/348.3; 526/348.4; 526/348.5; 526/348.6; 526/161; 526/352
[58] Field of Search .............. 526/348.1, 348.2, 526/348.3, 348.4, 348.5, 348.6, 161, 352

[56] References Cited

U.S. PATENT DOCUMENTS 3,920,621  11/1975  Baxmann et al. ............ 260/80.78
5,039,766   4/1991  Sasaki et al. ................ 526/161
5,258,476  11/1993  Sasaki et al. ................ 526/161

FOREIGN PATENT DOCUMENTS 0476671  3/1992  European Pat. Off.
2171278  9/1973  France.

OTHER PUBLICATIONS

*Encyclopedia of Poly. Sci. and Eng.*, vol. 6, p. 385 (1986).
*Encyclopedia of Poly. Sci. and Eng.*, vol. 6, p. 451 (1986).
*Chemical Abstracts*, 117:27412g (1992), John G. Hefner et al., "Homogeneous titanium complex catalysts and their manufacture and use in olefin polymerization".
*Polymer Journal*, vol. 24, No. 9, 1992, pp. 939–949 XP330633, Hosda, "Effect of the structural distribution on the mechanical properties of linear low–density polyethylenes".

*Primary Examiner*—David W. Wu
*Attorney, Agent, or Firm*—Watson Cole Stevens Davis, P.L.L.C.

[57] ABSTRACT

An ethylene-α-olefin copolymer having;
(A) a density (ρ) of from 0.870 to 0.945 g/cm$^3$,
(B) a ratio (TVR) of trans-vinylene type carbon-carbon double bonds to total cabon-carbon double bonds as determined with an infrared absorption spectrum being 35% or more, and
(C) a weight average molecular weight (Mw) of from $3.0 \times 10^4$ to $6.0 \times 10^5$, and a molded article comprising thereof. The present invention provides an ethylene-α-olefin copolymer and a molded article comprising thereof having an excellent transparency, high gloss and high melt tension.

21 Claims, No Drawings

ETHYLENE-α-OLEFIN COPOLYMER AND A MOLDED ARTICLE THEREFOR

This application is a continuation of application Ser. No. 08/357,785, filed Dec. 16, 1994, now abandoned which in turn is a Continuation of application, Ser. No. 08/118,266 filed Sep. 9, 1993, now abandoned.

FIELD OF THE INVENTION

The present invention relates to an ethylene-α-olefin copolymer and a molded article thereof. More particularly, it relates to an ethylene-α-olefin copolymer which exhibits high moldability and those physical properties required for use as films, blow moldings and injection moldings, such as high transparency, high gloss, high melt tension, high impact strength, high tensile strength and high modulus. Further, the present invention relates to a molded article, especially a film, obtained from said ethylene-α-olefin copolymer.

BACKGROUND OF THE INVENTION

Linear-low-density polyethylene(LLDPE) prepared by ionic polymerization of ethylene and α-olefin exhibits mechanical properties, such as impact strength, tensile strength and resistance for environmental stress-cracking that are superior to those of low-density polyethylene(LDPE) prepared by radical polymerization, and has therefore been used widely as materials for films, blow moldings and injection moldings.

LLDPE has, however, certain undesirable properties such as low melt tension and low transparency, and, because of these properties, its use is restricted. For example, when the polymers of a low melt tension are subjected to the conventional inflation film molding processes for manufacturing of films, so unstable bubbles are formed that films can hardly be manufactured. Moreover, when the polymers of a low melt tension are used in the blow molding processes, the extruded molten parison will deform by its own gravity.

The most common approach to improve the melt tension and transparency of LLDPE has been to blend LLDPW with LDPE. However, this approach has a defect in that the addition of LDPE to LLDPE sacrifices the mechanical strength of LLDPE, and that more man power and time are required for the blending operation.

Recently, there have been demands for improved ethylene-α-olefin copolymers having a high melt tension and transparency, and retaining good mechanical properties such as high impact strength, high tensile strength and high modulus.

The present inventors have extensively investigated seeking improved ethylene-α-olefin copolymers with the above mentioned properties, and, as a result of the investigation, have found that an ethylene-α-olefin copolymer, of which ratio of carbon-carbon double bonds in the form of trans-vinylene (trans-vinylene type carbon-carbon double bonds) to the total carbon-carbon double bonds (hereinafter referred to as TVR) is not less than 35%, possesses a high melt tension and a high transparency as well as high methanical properties.

SUMMARY OF THE INVENTION

Accordingly an object of this invention is to provide an ethylene-α-olefin copolymer having high melt tension and high transparency which highly satisfies all above-described physical properties and moldabilities.

Another object of this invention is to provide a molded article, especially a film, comprising an ethylene-α-olefin copolymer having high melt tension and high transparency which highly satisfies all above-described physical properties.

That is, the present invention relates to an ethylene-α-olefin copolymer having;
(A) a density (ρ) of from 0.870 to 0.945 g/cm$^3$,
(B) a ratio (TVR) of trans-vinylene type carbon-carbon double bonds to total carbon-carbon double bonds as determined with an infrared absorption spectrum being 35% or more, and
(C) a weight average molecular weight (Mw) of from $3.0 \times 10^4$ to $6.0 \times 10^5$.

The present invention further relates to a molded article, especially a film, comprising an ethylene-α-olefin copolymer having;
(A) a density (ρ) of from 0.870 to 0.945 g/cm$^3$,
(B) a ratio (TVR) of trans-vinylene type carbon-carbon double bonds to total carbon-carbon double bonds as determined with an infrared absorption spectrum being 35% or more, and
(C) a weight average molecular weight (Mw) of from $3.0 \times 10^4$ to $6.0 \times 10^5$.

DETAILED DESCRIPTION OF THE INVENTION

The present invention will now be described in detail below.

The copolymer according to the present invention has (B) a ratio (TVR) of trans-vinylene type carbon-carbon double bonds to total carbon-carbon double bonds as determined with an infrared absorptin spectrum being 35% or more, preferably being 40% or more, more preferably 45% or more, and exhibits superior optical properties such as a high transparency and gloss and the like, and a higher melt tension in comparison with the conventional LLDPE.

In the case of conventional LLDPE, TVR is 30% or less, usually in a range of 5 to 20%, and that of LDPE is about 10%. The conventional LLDPE with TVR of less than 35% suffers from low melt tension and transparency.

It is considered that the high TVR of the ethylene-α-olefin copolymer of the present invention indicates the peculiarity of the terminal structure of the copolymer; namely, long length of branchings are formed in side chains of the copolymer. The inventors believe that this structure contributes to the improvements of transparency and melt properties.

If said TVR of the copolymer is less than 35%, the copolymer suffers from low melt tension and low transparency.

In the copolymer according to the present invention, the number (TVN) of trans-vinylene type carbon-carbon double bonds per 2000 carbons is preferably 0.3 or more.

Determination of said TVR and TVN are later described.

The copolymer according to the present invention has (A) a density (ρ) of from 0.870 to 0.945 g/cm$^3$ measured by JIS K6760, preferably from 0.880 to 0.940 g/cm$^3$, more preferably from 0.885 to 0.935 g/cm$^3$. If the density is less than 0.870 g/cm$^3$, the surface of the copolymer becomes tacky, and when it exceeds 0.945 g/cm$^3$, the copolymer will start to lose transparency and impact strength.

The copolymer according to the present invention has (C) a weight average molecular weight (Mw) of from $3.0 \times 10^4$ to $6.0 \times 10^5$, preferably from $4.0 \times 10^4$ to $4.0 \times 10^5$. When the Mw of the copolymer becomes less than $3.0 \times 10^4$, its mechanical properties start to deteriorate, and the moldability of the copolymer suffers when its Mw exceeds $6.0 \times 10^5$.

Preferably, the copolymer according to the present invention has (D) a ratio (Mw/Mn) of a weight average molecular weight (Mw) to a number average molecular weight (Mn) being from 3 to 20. If said ratio (Mw/Mn) is less than 3, moldability deteriorates, and if said ratio (Mw/Mn) is more than 20, mechanical properties deteriorate. More preferably, said ratio (Mw/Mn) is from 3.5 to 15.

Preferably, the copolymer according to the present invention has (E) a coefficient (Px) of moldability represented by the following formula (1) of from 0.05 to 0.60.

$$Px=Mb/Mw \qquad (1)$$

wherein Mb is an average molecular weight of fragments between branchings, and Mw is a weight average molecular weight described as above. Said Px depends heavily on the structure of the copolymer, such as a molecular weight distribution and a long chain branching, and exhibits a level of moldability. When said Px exceeds 0.60, the moldability of the copolymer suffers, and mechanical properties deteriorate when said Px is less than 0.05. Accordingly, the Px of the copolymer having both high moldability and high mechanical properties will be in the above-mentioned range. More preferably, said Px is from 0.10 to 0.50, further preferably from 0.15 to 0.45.

Preferably, the copolymer according to the present invention has (F) a coefficient (Cx) of variation of chemical composition distribution (CCD) represented by the following formula (2) of from 0.40 to 0.80.

$$Cx=\sigma/SCB_{ave} \qquad (2)$$

wherein $\sigma$ is a standard deviation of chemical composition distribution (CCD) (1/1000 C), and $SCB_{ave}$ is an average of the number of short chain branchings per 1000 C (1/1000 C). The CCD exhibits a distribution of $\alpha$-olefin in the copolymer. When said Cx exceeds 0.80, the surface of the copolymer becomes tacky, and when it is less than 0.40, the melt tension becomes low. More preferably, said Cx is from 0.45 to 0.75, further preferably from 0.45 to 0.70.

Preferably, the copolymer according to the present invention has (G) a swelling ratio(SR) of 1.25 or more, more preferably 1.35 or more, further preferably 1.45 or more. In the case of conventional LLDPE, said SR is usually less than 1.25. If said SR is less than 1.25, not so high melt tension can be obtained.

Preferably, the copolymer according to the present invention has (H) a melt flow rate (MFR) of from 0.01 to 9 g/10 min., as measured according to JIS K6760 (190° C., 2.16 kg), when it is used as films, blow moldings and extrusion moldings etc., which require relatively high melt tension. If MFR is less than 0.01 g/10 min., it becomes difficult to mold, and if MFR is more than 9 g/10 min., moldability also becomes poor and mechanical properties deteriorate.

Determinations of said (A) to (H) are later described.

The ethylene-$\alpha$-olefin copolymer of the present invention can be obtained by polymerization of ethylene and $\alpha$-olefin. The $\alpha$-olefin to be copolymerized with ethylene contains from 3 to 30 carbon atoms as represented by the formula:

$$R-CH=CH_2$$

wherein R represents an alkyl group having from 1 to 28 carbon atoms.

Specific examples of the $\alpha$-olefin include propylene, butene-1, pentene-1, hexene-1, heptene-1, octene-1, nonene-1, decene-1, octadecene-1, eicosene-1, 4-methylpentene-1, 4-methylhexene-1, 4,4-dimethyl-pentene-1. If desired, these $\alpha$-olefins may be used in combination with two or more thereof. Among these $\alpha$-olefins, in particular, those having from 4 to 8 carbon atoms, such as butene-1, pentene-1, hexene-1, octene-1 and 4-methylpentene-1 are preferred in view of availability and quality of the resulting copolymers. The content of the $\alpha$-olefin in a copolymer can be from 0.4 to 25 mol %.

The copolymer according to the present invention can be provided by copolymerizing ethylene and $\alpha$-olefin in the presence of the following catalyst.

The catalyst for polymerization of the ethylene-$\alpha$-olefin copolymer according to the present invention preferably comprises;

(A) a reaction product of (A1) a titanium compound having at least one titanium-nitrogen bond with (A2) an organomagnesium compound, and (B) an organoaluminum compound.

The titanium compound (A1) used in the present invention is a compound which has at least one titanium-nitrogen bond. It may be, more preferably, a titanium compound represented by the formula;

$$(R^1R^2N)_{4-(m+n)}TiX_mY_n$$

wherein $R^1$ and $R^2$, which may be the same or different, each represents a hydrocarbon residue having 1–30 carbon atoms, X is a halogen, Y is an alkoxy group, m is a number defined by the equation $0 \leq m \leq 3$, and n is a number defined by the equation $0 \leq n \leq 3$, provided that (m+n) is defined by the equation $0 \leq (m+n) \leq 3$.

The halogen denoted by X in the above formula may be chlorine, bromine, or iodine, but is preferably chlorine from the viewpoint of catalytic activity. The alkoxy group Y may be, for example, an alkoxy group having 1–20 carbon atoms, such as methoxy, ethoxy, propoxy, butoxy and 2-ethylhexyloxy, but it is not particularly limited from the viewpoint of the performance of the catalyst obtained.

Among such titanium compounds, when $R^1$ and $R^2$ are each an aliphatic hydrocarbon residue, particularly those wherein the number of carbon atoms is 8–10 are preferred. Further, even when the number of carbon atoms is less than 8, those compounds wherein m is 0 or 2 are more preferred because they give a copolymer having a narrower chemical composition distribution (CCD).

Specific examples of such compounds include bis(dimethylamino)titanium dichloride, tetrakis(dimethylamino)titanium, bis(diethylamino)titanium dichloride, tetrakis(diethylamino)titanium, bis(diisopropylamino)titanium dichloride, tetrakis(diisopropylamino)titanium, bis(dipropylamino)titanium dichloride, tetrakis(dipropylamino)titanium, bis(diisobutylamino)titanium dichloride, tetrakis(diisobutylamino)titanium, bis(di-tert-butylamino)titanium dichloride, tetrakis(di-tert-butylaminotitanium, bis(dibutylamino)titanium dichloride, tetrakis(dibutylamino)titanium, bis(dihexylamino)titanium dichloride, tetrakis(dihexylamino)titanium, dioctylaminotitanium trichloride, bis(dioctylamino)titanium dichloride, tris(dioctylamino)titanium chloride, tetrakis(dioctylamino)titanium, didecylaminotitanium trichloride, bis(didecylamino)titanium dichloride, tris(didecylamino)titanium chloride, tetrakis(didecylamino)titanium, dioctadecylaminotitanium trichloride, bis(dioctadecylamino)titanium dichloride, tris(dioctadecylamino)titanium chloride, tetrakis(dioctadecylamino)titanium, ethoxy(dimethylamino)titanium dichloride, ethoxy(diethylamino)titanium dichloride, ethoxy(dipropylamino)titanium dichloride, ethoxy(diisopropylamino)titanium dichloride, ethoxy(diisobutylamino)titanium dichloride, ethoxy(di-tert-butylamino)titanium dichloride, ethoxy(dibutylamino)titanium dichloride, ethoxy(dihexylamino)titanium dichloride, ethoxy(dioctylamino)titanium dichloride, propoxy(dimethylamino)titanium dichloride, propoxy(diethylamino)titanium dichloride, propoxy(dipropylamino)titanium dichloride, propoxy(diisopropylamino)titanium dichloride, propoxy(diisobutylamino)titanium dichloride, propoxy(di-tert-butylamino)titanium dichloride, propoxy(dibutylamino)titanium dichloride, propoxy(dihexylamino)titanium dichloride, propoxy(dioctylamino)titanium dichloride, butoxy(dimethylamino)titanium dichloride, butoxy(diethylamino)titanium dichloride, butoxy(dipropylamino)titanium dichloride, butoxy(diisobutylamino)titanium dichloride, butoxy(di-tert-butylamino)titanium dichloride, butoxy(dibutylamino)-titanium dichloride, butoxy(dihexylamino)titanium dichloride, butoxy(dioctylamino)titanium dichloride, hexyloxy(dioctylamino)titanium dichloride, 2-ethylhexyloxy(dioctylamino)titanium dichloride, decyloxy(dioctylamino)titanium dichloride, ethoxy(didecylamino)titanium dichloride, hexyloxy(didecylamino)titanium dichloride, 2-ethyl-hexyloxy-(didecylamino)titanium dichloride, decyloxy(didecylamino)titanium dichloride, ethoxy(dioctadecylamino)titanium dichloride, 2-ethylhexyloxy(dioctadecylamino)titanium dichloride, decyloxy(dioctadecylamino)titanium dichloride, hexyloxybis(dioctylamino)titanium chloride, 2-ethylhexyloxybis(dioctylamino)titanium chloride, decyloxybis(dioctylamino)titanium chloride, hexyloxybis(didecylamino)titanium chloride, 2-ethylhexyloxybis(didecylamino)titanium chloride, decyloxybis(didecylamino)titanium chloride, hexyloxybis(dioctadecylamino)titanium chloride, 2-ethylhexyloxybis(dioctadecylamino)titanium chloride, decyloxybis(dioctadecylamino)titanium chloride, methoxytris(dimethylamino)titanium, ethoxytris(dimethylamino)titanium, butoxytris(dimethylamino)titanium, hexyloxytris(dimethylamino)titanium, 2-ethylhexyloxytris(dimethylamino)titanium, decyloxytris(dimethylamino)titanium, methoxytris(diethylamino)titanium, ethoxytris(diethylamino)titanium, butoxytris(diethylamino)titanium, hexyloxytris(diethylamino)titanium, 2-ethylhexyloxytris(diethylamino)titanium, decyloxytris(diethylamino)titanium, methoxytris(dipropylamino)titanium, ethoxytris(dipropylamino)titanium, butoxytris(dipropylamino)titanium, hexyloxytris(dipropylamino)titanium, 2-ethylhexyloxytris(dipropylamino)titanium, decyloxytris(dipropylamino)titanium, methoxytris(dibutylamino)titanium, ethoxytris(dibutylamino)titanium, butoxytris(dibutylamino)titanium, hexyloxytris(dibutylamino)titanium, 2-ethylhexyloxytris(dibutylamino)titanium, decyloxytris(dibutylamino)titanium, methoxytris(dihexylamino)titanium, ethoxytris(dihexylamino)titanium, butoxytris(dihexylamino)titanium, hexyloxytris(dihexylamino)titanium, 2-ethylhexyloxytris(dihexylamino)titanium, decyloxytris(dihexylamino)titanium, methoxytris(dioctylamino)titanium, ethoxytris(dioctylamino)titanium, butoxytris(dioctylamino)titanium, hexyloxytris(dioctylamino)titanium, 2-ethylhexyloxytris(dioctylamino)titanium, decyloxytris(dioctylamino)titanium, methoxytris(didecylamino)titanium, ethoxytris(didecylamino)titanium, butoxytris(didecylamino)titanium, hexyloxytris(didecylamino)titanium, 2-ethylhexyloxytris(didecylamino)titanium, decyloxytris(didecylamino)titanium, methoxytris(dioctadecylamino)titanium, ethoxytris(dioctadecylamino)titanium, butoxytris(dioctadecylamino)titanium, hexyloxytris(dioctadecylamino)titanium, 2-ethylhexyloxytris(dioctadecylamino)titanium, and decyloxytris(dioctadecylamino)titanium.

Among such titanium compounds, those wherein m in the formula is 1 are particularly preferred because they give the highest catalytic activity.

Examples of such compounds include tris(dioctylamino)titanium chloride, tris(didecylamino)titanium chloride, tris(dioctadecylamino)titanium chloride, hexyloxybis(dioctylamino)titanium chloride, 2-ethylhexyloxybis(dioctylamino)titanium chloride, decyloxybis(dioctylamino)titanium chloride, hexyloxybis(didecylamino)titanium chloride, 2-ethylhexyloxybis(didecylamino)titanium chloride, decyloxybis(didecylamino)titanium chloride, hexyloxybis(dioctadecylamino)titanium chloride, 2-ethylhexyloxybis(dioctadecylamino)titanium chloride, and decyloxybis(dicctadecylamino)titanium chloride.

Such titanium compounds (A1) may be synthesized, for example, by using the methods described in JP-B-41-5397; JP-B-42-11646; H. Burger et al., J. of Organomet. Chem., 108 (1976), 69–84; and H, Bürger, Z. Anorg. Allg. Chem. 365, 243–254 (1991).

They may be synthesized, for example, by reacting, (i) a secondary amine represented by the formula;

$$R^3R^4NH$$

wherein $R^3$ and $R^4$ each denotes a hydrocarbon residue having 1–30 carbon atoms and may be the same or different, with (ii) an alkylalkaline metal represented by the formula;

$$R^5M$$

wherein $R^5$ denotes a hydrocarbon residue having 1–30 carbon atoms and M denotes an alkaline metal, such as Li and K, and then reacting the resulting alkaline metal amide compound with a titanium tetrahalide represented by the formula;

$$TiX_4$$

wherein X denotes a halogen, such as chlorine, bromine and iodine, preferably chlorine.

In the above synthesis, two or more alkaline metal amide compounds may be used in combination.

The organomagnesium compound (A2) used for the synthesis of the reaction product (A) in the present invention may be any type of organomagnesium compound which contains a magnesium-carbon bond.

Examples of the organomagnesium compound (A2) include organomagnesium compounds represented by the formulas;

$$R^6R^7Mg$$

$$R^8MgZ^1$$

$$R^9MgX$$

wherein $R^6$, $R^7$, $R^8$ and $R^9$ each denotes a hydrocarbon residue having 1–20 carbon atoms, Z denotes a hydrogen atom or an alkoxy group, and X denotes a halogen.

In the above formulas $R^6$, $R^7$, $R^8$ and $R^9$ may be the same or different and each denotes an alkyl group, a cycloalkyl group, aryl group, aralkyl group or alkenyl group each having 1–20 carbon atoms, e.g., methyl, ethyl, propyl, isopropyl, butyl, sec-butyl, tert-butyl, amyl, isoamyl, hexyl, octyl, 2-ethylhexyl, phenyl, benzyl, vinyl, 1-propenyl and 2-propenyl.

Specific examples of the compounds represented by the formula $R^6R^7Mg$, include dimethylmagnesium, diethylmagnesium, dipropylmagnesium, diisopropylmagnesium, dibutylmagnesium, diisobutylmagnesium, di-sec-butylmagnesium, di-tert-butylmagnesium, diamylmagnesium, dineopentylmagnesium, dihexylmagnesium, dicyclohexylmagnesium, diphenylmagnesium, dibenzylmagnesium, divinylmagnesium, di-2-propenylmagnesium, di-2-butenylmagnesium, bis(trimethylsilylmethyl)magnesium, methylethylmagnesium, methylpropylmagnesium, methylisopropylmagnesium, methylbutylmagnesium, methylisobutylmagnesium, methyl-sec-butylmagnesium, methyl-tert-butylmagnesium, methylamylmagnesium, methylneopentylmagnesium, methylhexylmagnesium, methylcyclohexylmagnesium, methylphenylmagnesium, methylbenzylmagnesium, methylvinylmagnesium, methyl-2-propenylmagnesium, methyl-2-butenylmagnesium, methyl(trimethylsilylmethyl)magnesium, ethylpropylmagnesium, ethylisopropylmagnesium, ethylbutylmagnesium, ethylisobutylmagnesium, ethyl-sec-butylmagnesium, ethyl-tert-butylmagnesium, ethylamylmagnesium, ethylneopentylmagnesium, ethylhexylmagnesium, ethylcyclohexylmagnesium, ethylphenylmagnesium, ethylbenzylmagnesium, ethylvinylmagnesium, ethyl-2-propenylmagnesium, ethyl-2-butenylmagnesium, ethyl(trimethylsilylmethyl)magnesium, propylisopropylmagnesium, propylbutylmagnesium, propylisobutylmagnesium, propyl-sec-butylmagnesium, propyl-tert-butylmagnesium, propylamylmagnsium, propylneopentylmagnesium, propylhexylmagnesium, propylcyclohexylmagnesium, propylphenylmagnesium, propylbenzylmagnesium, propylvinylmagnesium, propyl-2-propenylmagnesium, propyl-2-butenylmagnesium, prcpyl(trimethylsilylmethyl)magnesium, isopropylbutylmagnesium, isopropylisobutylmagnesium, isopropyl-sec-butylmagnesium, isopropyl-tert-butylmagnesium, isopropylamylmagnesium, isopropylneopentylmagnesium, isopropylhexylmagnesium, isopropylcyclohexylmagnesium, isopropylphenylmagnesium, isopropylbenzylmagnesium, isopropylvinylmagnesium, isopropyl-2-propenylmagnesium, isopropyl-2-butenylmagnesium, isopropyl(trimethylsilylmethyl)magnesium, butylisobutylmagnesium, butyl-sec-butylmagnesium, butyl-tert-butylmagnesium, butylamylmagnesium, butylneopentylmagnesium, butylhexylmagnesium, butylcyclohexylmagnesium, butylphenylmagnesium, butylbenzylmagnesium, butylvinylmagnesium, butyl-2-propenylmagnesium, butyl-2-butenylmagnesium, butyl(trimethylsilylmethyl)magnesium, isobutyl-secbutylmagnesium, isobutyl-tert-butylmagnesium, isobutylamylmagnesium, isobutylneopentylmagnesium, isobutylhexylmagnesium, isobutylcyclohexylmagnesium, isobutylphenylmagnesium, isobutylbenzylmagnesium, isobutylvinylmagnesium, isobutyl-2-propenylmagnesium, isobutyl-2-butenylmagnesium, isobutyl(trimethylsilylmethyl)magnesium, sec-butyl-tert-butylmagnesium, sec-butylamylmagnesium, sec-butylneopentylmagnesium, sec-butylhexylmagnesium, sec-butylcyclohexylmagnesium, sec-butylphenylmagnesium, sec-butylbenzylmagnesium, sec-butylvinylmagnesium, sec-butyl-2-propenylmagnesium, sec-butyl-2-butenylmagnesium, sec-butyl(trimethylsilylmethyl)magnesium, tert-butylamylmagnesium, tert-butylneopentylmagnesium, tert-butylhexylmagnesium, tert-butylcyclohexylmagnesium, tert-butylphenylmagnesium, tert-butylbenzylmagnesium, tert-butylvinylmagnesium, tert-butyl-2-propenylmagnesium, tert-butyl-2-butenylmagnesium, tert-butyl(trimethylsilylmethyl)magnesium, amylneopentylmagnesium, amylhexylmagnesium, amylcyclohexylmagnesium, amylphenylmagnesium, amylbenzylmagnesium, amylvinylmagnesium, amyl-2-propenylmagnesium, amyl-2-butenylmagnesium, amyl(trimethylsilylmethyl)magnesium, neopentylhexylmagnesium, neopentylcyclohexylmagnesium, neopentylphenylmagnesium, neopentylbenzylmagnesium, neopentylvinylmagnesium, neopentyl-2-propenylmagnesium, neopentyl-2-butenylmagnesium, neopentyl(trimethylsilylmethyl)magnesium, hexylcyclohexylmagnesium, hexylphenylmagnesium, hexylbenzylmagnesium, hexylvinylmagnesium, hexyl-2-propenylmagnesium, hexyl-2-butenylmagnesium, hexyl(trimethylsilylmethyl)magnesium, phenylbenzylmagnesium, phenylvinylmagnesium, phenyl-2-propenylmagnesium, phenyl-2-butenylmagnesium, phenyl(trimethylsilylmethyl)magnesium, benzylvinylmagnesium, benzyl-2-propenylmagnesium, benzyl-2-butenylmagnesium, benzyl(trimethylsilylmethyl)magnesium, vinyl-2-propenylmagnesium, vinyl-2-butenylmagnesium, and vinyl(trimethylsilylmethyl)magnesium.

Examples of the ccmpounds represented by the formula $R^8MgZ^1$, include ethylmagnesium hydride, propylmagnesium hydride, isopropylmagnesium hydride, butylmagnesium hydride, sec-butylmagnesium hydride, tert-butylmagnesium hydride, phenylmagnesium hydride, ethylmagnesium methoxide, ethylmagnesium ethoxide, ethylmagnesium propoxide, ethylmagnesium butoxide, ethylmagnesium phenoxide, propylmagnesium methoxide, propylmagnesium ethoxide, propylmagnesium propoxide, propylmagnesium butoxide, propylmagnesium phenoxide, isopropylmagnesium methoxide, isopropylmagnesium ethoxide, isopropylmagnesium propoxide, isopropylmagnesium butoxide, isopropylmagnesium phenoxide, butylmagnesium methoxide, butylmagnesium ethoxide, butylmagnesium propoxide, butylmagnesium butoxide, butylmagnesium phenoxide, sec-butylmagnesium methoxide, sec-butylmagnesium ethoxide, sec-butylmagnesium propoxide, sec-butylmagnesium butoxide, sec-butylmagnesium phenoxide, tert-butylmagnesium methoxide, tert-butylmagnesium ethoxide, tert-butylmagnesium propoxide, tert-butylmagnesium butoxide, tert-butylmagnesium phenoxide, phenylmagnesium methoxide, phenylmagnesium ethoxide, phenylmagnesium propoxide, phenylmagnesium butoxide, and phenylmagnesium phenoxide.

Examples of the compounds represented by the formula $R^9MgX$, include methylmagnesium chloride, ethylmagnesium chloride, ethylmagnesium bromide, ethylmagnesium iodide, propylmagnesium chloride, propylmagnesium bromide, butylmagnesium chloride, butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride, vinylmagnesium chloride, vinylmagnesium bromide, 1-propenylmagnesium chloride, 1-propenylmagnesium bromide, 2-propenylmagnesium chloride, 2-propenylmagnesium bromide, phenylmagnesium chloride, phenylmagnesium bromide, benzylmagnesium chloride and benzylmagnesium bromide.

From the viewpoint of the CCD of the copolymer provided, the organomagnesium compounds are preferably those which are represented by the formula $R^6R^7Mg$. Among them, those wherein $R^6$ and $R^7$ are each an aliphatic hydrocarbon residue are more preferred.

Specific examples of such organomagnesium compounds include dimethylmagnesium, diethylmagnesium, dipropylmagnesium, diisopropylmagnesium, dibutylmagnesium, diisobutylmagnesium, di-sec-butylmagnesium, di-tert-butylmagnesium, diamylmagnesium, dineopentylmagnesium, dihexylmagnesium, dicyclohexylmagnesium, methylethylmagnesium, methylpropylmagnesium, methylisopropylmagnesium, methylbutylmagnesium, methylisobutylmagnesium, methyl-sec-butylmagnesium, methyl-tert-butylmagnesium, methylamylmagnesium, methylneopentylmagnesium, methylhexylmagnesium, methylcyclohexylmagnesium, ethylpropylmagnesium, ethylisopropylmagnesium, ethylbutylmagnesium, ethylisobutylmagnesium, ethyl-sec-butylmagnesium, ethyl-tert-butylmagnesium, ethylamylmagnesium, etkylneopentylmagnesium, ethylhexylmagnesium, ethylcyclohexylmagnesium, propylisopropylmagnesium, propylbutylmagnesium, propylisobutylmagnesium, propyl-sec-butylmagnesium, propyl-tert-butylmagnesium, propylamylmagnesium, propylneopentylmagnesium, propylhexylmagnesium, propylcyclohexylmagnesium, isopropylbutylmagnesium, isopropylisobutylmagnesium, isopropyl-sec-butylmagnesium, isopropyl-tert-butylmagnesium, isopropylamylmagnesium, isopropylneopentylmagnesium, isopropylhexylmagnesium, isopropylcyclohexylmagnesisum, butylisobutylmagnesium, butyl-sec-butylmagnesium, butyl-tert-butylmagnesium, butylamylmagnesium, butylneopentylmagnesium, butylhexylmagnesium, butylcyclohexylmagnesium, isobutyl-sec-butylmagnesium, isobutyl-tert-butylmagnesium, isobutylamylmagnesium, isobutylneopentylmagnesium, isobutylhexylmagnesium, isobutylcyclohexylmagnesium, sec-butyl-tert-butylmagnesium, sec-butylamylmagnesium, sec-butylneopentylmagnesium, sec-butylhexylmagnesium, sec-butylcyclohexylmagnesium, tert-butylamylmagnesium, tert-butylneopentylmagnesium, tert-butylhexylmagnesium, tert-butylcyclohexylmagnesium, amylneopentylmagnesium, amylhexylmagnesium, amylcyclohexylmagnesium, neopentylhexylmagnesium, neopentylcyclohexylmagnesium, and hexylcyclohexylmagnesium.

In place of the aforesaid organomagnesium compounds, hydrocarbon soluble complexes of the organomagnesium compounds with organometallic compounds may be used. The organometallic compounds may be, for example, organic compounds of Li, Be, B, Al or Zn.

The organoaluminum compounds (B) used in the present invention may be those known in the art. Such organoaluminum compounds (B) are, for example, organoaluminum compounds (B1) represented by the formula:

or chain or cyclic aluminoxanes (B2) having a structure represented by the formula.

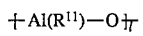

In the above formulas, $R^{10}$ and $R^{11}$ are each a hydrocarbon residue having 1–20 carbon atoms, preferably 1–10 carbon atoms, $Z^2$ denotes a hydrogen atom and/or an alkoxy group, a is a number defined by the equation $0<a\leq 3$, and l is an integer of 1 or more, preferably 2–30.

Specific examples of organoaluminum compounds (B1) represented by the formula $R^{10}{}_a AlZ^2{}_{3-a}$ include trialkylaluminums; such as trimethylaluminum, triethylaluminum, tripropylaluminum, triisobutylaluminum, trihexylaluminum, trioctylaluminum and tridecylaluminum; dialkylaluminum hydrides, such as dimethylaluminum hydride, diethylaluminum hydride, dipropylaluminum hydride, diisobutylaluminum hydride, dihexylaluminum hydride, dioctylaluminum hydride and didecylaluminum hydride; alkoxyalkylaluminum hydrides, such as methoxymethylaluminum hydride, methoxyethylaluminum hydrides, methoxyisobutylaluminum hydride, ethoxyhexylaluminum hydride and ethoxydecylaluminum hydride; and alkylaluminum alkoxydes, such as dimethylaluminum methoxide, methylaluminum dimethoxide, diethylaluminum methoxide, ethylaluminum dimethoxide, diisobutylaluminum methoxide, isobutylaluminum dimethoxide, dihexylaluminum methoxide, hexylaluminum dimethoxide, dimethylaluminum ethoxide, methylaluminum diethoxide, diethylaluminum ethoxide, diisobutylaluminum ethoxide and isobutylaluminum diethoxide.

Preferred of such compounds from the viewpoint of catalytic activity are trialkylaluminums, which are compounds of the above formula wherein a is 3, such as trimethylaluminum, triethylaluminum, tripropylaluminum, triisobutylaluminum, trihexylaluminum, trioctylaluminum, tridecylaluminum, and the like. However, the present invention is not limited to the above-mentioned compounds.

Specific examples of aluminoxanes (B2) represented by the formula $-[Al(R^{11})(-O-)]_l$ include tetramethyldialuminoxane, tetraethyldialuminoxane, tetrabutyldialuminoxane, tetrahexyldialuminoxane, methylaluminoxane, ethylaluminoxane, butylaluminoxane, hexylaluminoxane, and the like. The present invention, however, is not limited to the above-mentioned compounds.

The component (B) may be used in a wide range such as usually 0.01–1000 moles relative to 1 mole of titanium atom of the component (A), but it is preferably used in the range of 0.05–500 moles, more preferably 0.1–50 moles, relative to 1 mole of titanium atom.

Next, the synthesis of the reaction product (A) is described below.

The reaction product (A), namely, one of the catalyst components for providing the copolymer according to the present invention, can be prepared by reacting a titanium compound (A1) with an organomagnesium compound (A2). When the reaction product thus obtained contains a solid, it is preferable for polymerization that the reaction product is used in the form of slully, or that the solid is removed by filtration and the resulting liquid alone is used.

The use of the solid alone is not preferable because the solid formed has a very low catalytic activity as compared with the liquid component and further gives copolymers having a wide CCD.

The reaction of the titanium compound (A1) with the organomagnesium compound (A2) may be effected either by adding the organomagnesium compound (A2) to the titanium compound (A1) or by adding the titanium compound (A1) to the organomagnesium compound (A2). The reaction temperature is usually in the range of $-50°$ to $230°$ C., preferably $0°$ to $200°$ C. The reaction time is not particularly restricted, but usually 1 minutes to 2 hours. The amount of the organomagnesium compound (A2) used is, in terms of the atomic ratio of the magnesium in the organomagnesium compound (A2) to the titanium in the titanium compound (A1), in the range of usually 0.01–1000, preferably 0.05–100, and more preferably 0.1–10.

In addition to the above-mentioned catalyst, the following catalyst can be used for polymerization of the ethylene-α-olefin copolymer according to the present invention.

For example, a catalyst using an organoaluminum compound (A3) instead of an organomagnesium compound (A2) in the above-mentioned catalyst can be used.

That is;

(A) a reaction product of (A1) a titanium compound having at least one titanium-nitrogen bond with (A3) an organoaluminum compound, and (B) an organoaluminum compound.

Examples and methods for use of the titanium compounds (A1) and the organoaluminum compounds (A3) and (B) are the same as described above. In said catalyst, both of the organoaluminum compounds (A3) and (B) may be the same or different, and as the titanium compounds (A1), those with a smaller m are preferred because they give copolymers having a narrower CCD.

Specific examples of such titanium compounds (A1) include tetrakis(dimethylamino)titanium, tetrakis(diethylamino)titanium, tetrakis(diisopropylamino)titanium, tetrakis(dipropylamino)titanium, tetrakis(diisobutylamino)titanium, tetrakis(di-tertbutylamino)titanium, tetrakis(dibutylamino)titanium, tetrakis(dihexylamino)titanium, tetrakis(dioctylamino)titanium, tetrakis(didecylamino)titanium, tetrakis(dioctadecylamino)titanium, methoxytris(dimethylamino)titanium, ethoxytris(dimethylamino)titanium, butoxytris(dimethylamino)titanium, hexyloxytris(dimethylamino)titanium, 2-ethylhexyloxytris(dimethylamino)titanium, decyloxytris(dimethylamino)titanium, methoxytris(diethylamino)titanium, ethoxytris(diethylamino)titanium, butoxytris(diethylamino)titanium, hexyloxytris(diethylamino)titanium, 2-ethylhexyloxytris(diethylamino)titanium, decyloxytris(diethylamino)titanium, methoxytris(dipropylamino)titanium, ethoxytris(dipropylamino)titanium, butoxytris(dipropylamino)titanium, hexyloxytris(dipropylamino)titanium, 2-ethylhexyloxytris(dipropylamino)titanium, decyloxytris(dipropylamino)titanium, methoxytris(dibutylamino)titanium, ethoxytris(dibutylamino)titanium, butoxytris(dibutylamino)titanium, hexyloxytris(dibutylamino)titanium, 2-ethylhexyloxytris(dibutylamino)titanium, decyloxytris(dibutylamino)titanium, methoxytris(dihexylamino)titanium, ethoxytris(dihexylamino)titanium, butoxytris(dihexylamino)titanium, hexyloxytris(dihexylamino)titanium, 2-ethylhexyloxytris(dihexylamino)titanium, decyloxytris(dihexylamino)titanium, methoxytris(dioctylamino)titanium, ethoxytris(dioctylamino)titanium, butoxytris(dioctylamino)titanium, hexyloxytris(dioctylamino)titanium, 2-ethylhexyloxytris(dioctylamino)titanium, decyloxytris(dioctylamino)titanium, methoxytris(didecylamino)titanium, ethoxytris(didecylamino)titanium, butoxytris(didecylamino)titanium, hexyloxytris(didecylamino)titanium, 2-ethylhexyloxytris(didecylamino)titanium, decyloxytris(didecylamino)titanium, methoxytris(dioctadecylamino)titanium, ethoxytris(dioctadecylamino)titanium, butoxytris(dioctadecylamino)titanium, hexyloxytris(dioctadecylamino)titanium, 2-ethylhexyloxytris(dioctadecylamino)titanium, and decyloxytris(dioctadecylamino)titanium.

An example of a process for producing the ethylene-α-olefin copolymers using the catalyst components or the catalyst above-mentioned is described below.

The method for feeding the respective catalyst components to the polymerization vessel is subject to no particular restriction except that they should be fed in a inert gas, such as nitrogen or argon, and in the absence of moisture. The catalyst components (A) and (B) may be either fed individually or fed after having been made to contact with each other in advance.

The polymerization process of said ethylene-α-olefin ccpolymer can be adopted bulk (high temp.-high pressure) process, gas phase process, slurry process or solution process.

The polymerization temperature may be usually in the range of −30° to 300° C., but is preferably 0° to 280° C., more preferably 20° to 250° C. The polymerization pressure is not particularly restricted, but preferably about 3 to 1800 atm from the viewpoint of industrial practicality and economical efficiency.

The polymerization can be conducted either continuously or batchwide. It may be slurry or solution polymerization which uses an inert hydrocarbon solvent, such as propane, butane, pentane, hexane and octane, or bulk or gas phase polymerization which use no solvent.

Further, a chain transfer agent, such as hydrogen, may be added to the polymerization system in order to control the molecular weight of the copolymer of the present invention.

The catalyst and the process for producing the ethylene-α-olefin copolymer of the present invention are not restricted to the above-mentioned techniques.

Furthermore, if necessary, an antioxdant, a weatherability agent, an anti-static agent, anti-blocking agent, slip agent, anti-fogging agent, a nuclear agent, a pigment, a dyestuff, or an inorganic or an organic filler can be added to the ethylene-α-olefin copolymer obtained by the above-mentioned.

As above described, the ethylene-α-olefin copolymer according to the present invention exhibits superior optical property and moldability, and has excellent mechanical properties, such as impact strength, tensile strength and modulus. Therefore, it is especially good for use as a packaging film obtained by inflation or casting film molding process.

Further, the ethylene-α-olefin copolymer according to the present invention can be used not only as a packaging film, but as various moldings, such as a container, daily necessities, a pipe and a tube, which are obtained by blow molding process, injection molding process or extrusion molding process.

Furthermore, the ethylene-α-olefin copolymer according to the present invention can be used as various composite films obtained by extrusion laminating process or co-extrusion molding process, or as a laminating material for steel pipe and foamed moldings.

And, the ethylene-α-olefin copolymer according to the present invention can be used as blends with another thermoplastic resin, for example, polyolefin, such as high density polyethylene, medium density polyethylene, low density polyethylene, polypropylene, poly-1-butene, poly-4-methyl-1-pentene, ethylenepropylene copolymer having low or non crystallinity, ethylene-1-butene copolymer having low or non crystallinity and propylene-1-butene copolymer.

The present invention is now illustrated in greater detail by way of the following Examples and Comparative Examples, but it should be understood that the present invention is not deemed to be limited thereto.

In these examples, basic properties, general properties and film properties were measured by methods according to the followings.

Basic Properties (BP)

(1) Density ($\rho$):

Measured in accordance with JIS K6760.

(2) Comonomer Content (CC):

Determined with an infrared absorption spectrum of ethylene and α-olefin.

(3) The Number of trans-vinylene type carbon-carbon double bonds per 2000 carbons (TVN) and the Ratio of trans-vinylene type carbon-carbon double bonds to total carbon-carbon double bonds per 2000 carbons (TVR):

An infrared absorption spectrum from 1000 $cm^{-1}$ to 800 $cm^{-1}$ was determined with an infrared spectroscopic analyzer using 0.5 mm thickness of a press sheet obtained by press molding of the copolymer. On said spectrum, a baseline was drawed from 980 $cm^{-1}$ to near 860 $cm^{-1}$ through 950 $cm^{-1}$, then a vertical line was drawed from the peak of an absorption spectrum of an objective wave number (transvinylene type; 965 cm$^{-1}$, vinyl type; 909 cm$^{-1}$, vinylidene type; 888 cm$^{-1}$) to the baseline. The transmittance I was determined from an intersecting point of the vertical line and the absorption spectrum, and the transmittance $I_0$ was determined from an intersecting point of the vertical line and the baseline, then the number of each carbon-carbon double bonds per 2000 carbons (TVN) was calculated by the following formulas (3)–(6).

The number of trans-vinylene type carbon-carbon double bonds/2000 carbons $$(TVN)=0.328 \cdot f \cdot K'(965\ cm^{-1}) \qquad (3)$$

The number of vinyl type carbon-carbon double bonds/2000 carbons $$=0.231 \cdot f \cdot K'(909\ cm^{-1}) \qquad (4)$$

The number of vinylidene type carbon-carbon double bonds/2000 carbons $$=0.271 \cdot f \cdot K'(888\ cm^{-1}) \qquad (5)$$

K' (wave number)

$$=(\log I_0 - \log I)/(\rho \cdot l) \qquad (6)$$

ρ: A density of sample (g/cm$^3$)

l: A thickness of a sample (cm)

f: Determined by the above formula (3)–(6) in measurement of the standard sample having known numbers of respective carbon-carbon double bonds. It is usually in the range of 0.900–1.100.

From thus obtained numbers, the ratio of trans-vinylene type carbon-carbon double bonds to total carbon-carbon double bonds per 2000 carbons (TVR) was determined and expressed as a percentage.

(4) Weight Average Molecular Weight(Mw) and Number Average Molecular Weight(Mn):

Determined with a gel permeation chromatography (GPC) under the following conditions.

GPC Instrument; Model 150C manufactured by Waters Corporation.

Column; Model TSK GHM-6 (6 mmφ×600 mm) manufactured by Tosoh Corporation

Solvent; o-dichlorobenzene (ODCB)

Temperature; 135° C.

Volume rate; 1.0 ml/min.

Injection concentration of a polymer; 10 mg/10 ml ODCB

Injection volume; 500 μl

The column exclusion volume was corrected by the Universal Method using a standard polystyrene provided by Tosoh Corporation and Pressure Chemical Corporation.

(5) Average Molecular Weight of Fragments Between Branchings (Mb) and Coefficient of Moldability (Px):

Determined with a gel permeation chromatography (GPC) and a low angle laser light scattering photometer (LALLS) under the following conditions.

GPC Instrument; Model HLC-811 manufactured by Tosoh Corporation

LALLS Instrument; Model KMX-6 manufactured by Thermo Instrument System Co., Ltd.

The GPC Instrument was connected to the LALLS Instrument, and then an eluate was allowed to be able to pass from the column of GPC to the detector of GPC through the flow cell of LALLS. The filter was not provided between the column of GPC and the flow cell of LALLS.

Column; Model G7000S, G6000S, G4000S and G3000S (7.5 mmφ×600 mmL) manufactured by Tosoh Corporation Solvent; 1,2,4-trichlorobenzene (0.015% by weight of 2,6-di-tert-butyl-p-cresol were added thereto.)

Temperature; 140° C.

Volume rate; 1.0 ml/min.

Injection concentration of a polymer; 5×10$^{-4}$ g/ml solvent

Injection volume; 2ml

Sample making and Measurement;

① A solution of a polymer in a prescribed concentration (5×10$^{-4}$ g/ml) was prepared and heated at 140° C. for 2 hours to dissolve the polymer.

② The solution was filtrated at 140° C., using the filter of Fluoropore® FP-500 manufactured by Sumitomo Electric Industries, Ltd.

③ The filtrate was heated at 140° C. for 30 minutes, and then it was injected to the column of GPC.

Calculation;

① The weight of injected polymer P (g) ws calculated from the injection concentration of a polymer and injection volume.

② The average Rayleigh Ratio R (θ) and the amount of eluate V (ml) in the range of polymer-elution were calculated from GPC and LALLS chromatograms. The range of polymer-elution means a detected range of a peak which shows polymer component.

③ The molecular weight M$_{WLS}$ was calculated by the following formulas (7)–(9).

$$(K \cdot C)/R(\theta)=1/M' \qquad (7)$$

$$A_2=5.21 \times 10^{-2} M'^{-0.338} \qquad (8)$$

$$(K \cdot C)/R(\theta)=1/M_{WLS}+2A_2 C \qquad (9)$$

K: The instrument constant

C: Polymer concentration (=P/V)

$A_2$: The second virial coefficient

After the first calculation of M$_{WLS}$ by the formulas (7)–(9), M$_{WLS}$ was obtained. Next, said obtained M$_{WLS}$ was substituted for M' in the formula (8), then, M$_{WLS}$ was calculated again by the formula (9). Such calculation was repeated six times. Then, the M$_{WLS}$ was obtained. According to the present method, the molecular weight M$_{WLS}$ of SRM-1476 provided by National Bureau of Standards (USA) was determined as 166,000.

④ Average molecular weight of fragments between branchings Mb and coefficient of moldability Px was calculated by the following formulas (10)–(14).

$$[\eta]_r=4.35 \times 10^{-4} M_{WLS}^{0.711} \qquad (10)$$

$$g^{1.1}=[\eta]_s/[\eta]_r \qquad (11)$$

$[\eta]_s$: Intrinsic viscosity of a polymer, determined with Ubbelohde's viscometer, in tetralin at 135° C.

$$g=(6/n)[0.5((2+n)^{1/2}/n^{1/2})\ln(((2+n)^{1/2}+n^{1/2})/((2+n)^{1/2}-n^{1/2}))-1] \qquad (12)$$

$$Mb=M_{WLS}/(2n+1) \qquad (13)$$

$$Px=Mb/Mw \qquad (14)$$

Mw: Weight average molecular weight (6) Coefficient of Variation of Chemical Composition Distribution (Cx):

Construction of Testing Equipment;

On-line degasser; Model ERC-3322 manufactured by Elmer Co., Ltd.

Pump; Model CCPM manufactured by Tosoh Corporation

Electric switching valve; Model MV-8011 manufactured by Tosoh Corporation

Injection valve; Model M3-1/16-V6-P-SS manufactured by Valco Co., Ltd.

Column oven; Model SSP-43CR-43CR-A manufactured by Kato Co., ltd.

Detector; Model FT/IR-1760X manufactured by Perkin-Elmer Co., Ltd.

Fraction collector; Model MV-8010K manufactured by Tosoh Corporation

System controller; Model SC-8010 manufactured by Tosoh Corporation

Test Conditions;

Solvent; o-dichlorobenzene (ODCB)

Column; 21 mm$\phi$×150 mmL

Filler; Glass beads of 500 to 700 μm

Volume rate; 2.5 ml/min.

Injection concentration of a polymer; 1%

Injection volume; 6 ml

Steps of eluting temperature; 38 steps from −10° C. to 105° C.

Eluting temperature (Ti); −10, 0, 5, 10, 14, 18, 21, 24, 27, 30, 33, 36, 39, 42, 45, 48, 51, 54, 57, 60, 63, 66, 69, 72, 75, 78, 80, 82, 84, 86, 88, 90, 92, 94, 96, 98, 101 and 105 (°C.)

The flow path after the column oven was heated at 145° C. Before passing the solvent through the column, the solvent was preheated in a flow channel of about 20 ml provided in the column oven.

FT/IR Condition;

Resolution; 8 cm$^{-1}$

Flow cell; KBr-made window, cell length=0.5 mm, heated solution flow cell.

Method of Measurement;

(i) Preparation of Polymer Solution;

A solution of a polymer in a prescribed concentration was prepared and heated at 145° C. for 4 hours to dissolve the polymer.

(ii) Procedure of Temperature Rise Fractionation;

① A polymer solution heated to 145° C. was positioned at the center of the column set in the column oven heated at 145° C. by means of an injection valve and a pump.

② The temperature of the column oven was lowered from 145° C. to 90° C. at a cooling rate of 0.92° C./min. and from 90° C. to −10° C. at a colling rate of 0.25° C./min. while retaining the polymer solution at the center of the column.

③ The column oven temperature was kept at −10° C. for 2 hours.

④ A solvent was passed into the FT/IR flow cell through the flow path bypassing the column by means of a pump, and the FT/IR background was measured (number of integrations=50). After the measurement of the background, the pump was stopped.

⑤ The solvent was made ready to flow through the column, and FT/IR measurement was started simultaneously with making the solvent to flow through the column by the pump.

Solvent feed time; 25 min.

FT/IR integrating time; 25 min. (number of integrations= 625)

⑥ The FT/IR spectrum obtained was saved in a floppy disc.

⑦ After the solvent passed, the column oven temperature was elevated to the next eluting temperature and maintained for 15 minutes.

⑧ The cycle consisting of the above procedure ④ to ⑦ was repeated for every eluting temperature.

⑨ Finally, the column oven temperature was raised up to 145° C., and a solvent was passed for 25 min. by means of the pump.

Data Processing;

① The peak area ($S_i$) of the FT/IR spectrum within an IR wavenumber of from 2983 to 2816 cm$^{-1}$ was obtained.

② Corrections for the irregular intervals of eluting temperatures were made according to the following formulas (15) and (16).

$$H_i = (\Sigma S_i - \Sigma S_{(i-1)})/(T_i - T_{(i-1)}) \qquad (15)$$

$$RH_i = H_i/\Sigma H_i \times 100 (\%) \qquad (16)$$

Ti: Eluting temperature $RH_i$: Relative concentration

③ The chemical composition distribution ($SCB_i$) was calculated by the formula (17).

$$SCB_i = 59.70 - 0.599 \times T_i (1/1000\ C) \qquad (17)$$

$SCB_i$: The number of short chain branchings per 1000 C

④ $SCB_i$ was plotted against $RH_i$, to obtain a chemical composition distribution curve.

⑤ From the chemical composition distribution curve was obtained Cx representing the breadth of the distribution according to the following formulas (18) and (19).

$$SCB_{ave} = (SCB_i \times RH_i)/\Sigma RH_i (1/1000\ C) \qquad (18)$$

$$Cx = \sigma/SCB_{ave} \qquad (19)$$

σ: Standard deviation of chemical composition distribution ($SCB_i$)

General Properties (GP)

(1) Melt Flow Rate (MFR):

Measured in accordance with JIS K6760.

(2) Swelling Ratio (SR):

Determined as follows. A one point five centimeter length of strand was extruded from the orifice of an instrument for MFR measurement, and said strand was carefully cooled to room temperature (in the range of 15°–30° C.) in a vertical state as to avoid deformation. Then at the 5 mm point from the end of said strand, a diameter (d) of it was measured, and SR was calculated from said diameter (d) and an internal diameter ($d_0$) of the orifice of the instrument for MFR measurement by the following formula (20).

$$SR = d/d_0 \qquad (20)$$

(3) Modulus (Olsen Flexural Modulus; FM):

Measured in accordance with ASTM D747.

Test piece; 70×25.4×1 mm

Span; 25.4 mm

Temp.; 23° C.

(4) Tensile Impact Strength (TIS):

Measured in accordance with ASTM D1822.

Test piece; S type dumbell, 1 mm in thickness.

Temp.; 23° C.

(5) Tensile Strength (TS):

Measured in accordance with JIS K6760.

Test piece; JIS NO. 2 dumbell, 2 mm in thickness.

Tensile rate; 200 mm/min.

Temp.; 23° C.

(6) Melt Tension (MT):

Determined with the melt tension tester, model II manufactured by Toyo Seiki Seisakusho. A specific volume of polymer was forcibly extruded from the orifice at a temperature of 150° C., then the tension generated from the extruded polymer being drawn to form monofilament was detected by strain gauge. The tension was measured until the melting polymer monofilament was cut with increasing drawing rate of a drawing roll by a specific rate. During said measurement of the tension from the start of drawing until the melting polymer monofilament being cut, the maximum tension was measured and said maximum tension ws regarded as the melt tension.

Extrusion rate; 0.32 g/min.

Orifice; 2.095 mm of a diameter and 8.000 mm of a length

Increasing drawing rate; 6.3 m/min.

(7) Torque (TRQ):

Using the plastograph, model PLV-151 manufactured by Brabender Corporation, 40 grams of sample and an antioxidant were kneaded. After 30 minutes from the start of kneading, the torque was measured.

Film Properties (FP)

(1) Haze:

Measured in accordance with ASTM D1033.

(2) Gloss:

Measured in accordance with JIS Z8741.

(3) Dart Drop Impact Strength (DIS):

Measured in accordance with ASTM D1709, Method A.

(4) Secant Modulus at 1% Strain (SM):

A 2 cm wide specimen cut out of a film in the machine direction (MD) or the transverse direction (TD) is fixed to a tensile tester at a chuck distance of 6 cm and pulled at a speed of 5 mm/min. The secant modulus can be calculated by inserting a stress at 1% elongation into formula [100×(stress)/(cross sectional area of the specimen)].

(5) Tensile Strength (TS):

Measured in accordance with JIS Z1702.

(6) Elmendorf Tear Strength (ET):

Measured in accordance with JIS Z1702.

EXAMPLE 1

Synthesis of Titanium Compound (A1)

A 3 l flask equipped with a stirrer, dropping funnel and thermometer was purged with argon gas, and 181 ml (600 mmoles) of dioctylaminne and 1.5 l of hexane were charged therein. Then, 387 ml (600 mmoles) of n-butyllithium diluted with hexane was added dropwise from the dropping funnel over a period of 30 minutes with stirring while keeping the temperature of the solution in the flask at 5° C. After completion of the addition, the reactin was further conducted at 5° C. for 2 hours and at 30° C. for 2 hours.

Then, 22 ml (200 mmoles) of $TiCl_4$ diluted with hexane was added dropwise from the dropping funnel to the liquid mixture obtained by the above reaction over a period of 30 minutes while keeping the temperature of the liquid mixture at 5° C. After completion of the addition, the reaction was further conducted at 5° C. for 1 hour and at 30° C. for 2 hours to obtain 200 mmoles of a titanium compound (A1) of the formula $[(C_8H_{17})_2N]_3TiCl$.

Reaction of Titanium Compound (A1) with Organomagnesium Compound (A2)

To the titanium compound obtained as above was added 300 ml (198 mmoles) of butylethylmagnesium (BEM) manufactured by Tosoh-Akzo Corporation diluted with heptane, and the resulting mixture was allowed to react for 1 hour while keeping the temperature at 30° C., to obtain 200 mmoles of a reaction product (A). (Catalyst concentration: 0.077 mmol Ti/ml).

Polymerization

An autoclave of 160 l inner volume equipped with a stirrer was purged with nitrogen. Then, 60 kg of butane as a solvent and 12 kg of butene-1 as an α-olefin were charged therein, and the reactor was heated up to 70 ° C. Thereafter, hydrogen and ethylene were fed into the reactor while adjusting the hydrogen pressure to 0.9 kg/cm and the ethylene pressure to 6.0 kg/cm$^2$. After the reaction system had become stable, 79.5 mmoles of triethylaluminum (TEA) was fed as an organoaluminum compound (B), and succeedingly 40 mmoles of the reaction product (A) synthesized as described above was fed into the reactor. Then polymerization was conducted for 3 hours while controlling the temperature at 70 ° C. and the ethylene pressure at 6.0 kg/cm$^2$. As the result of the polymerization, 9.2 kg of copolymer was obtained.

Basic properties (BP) of the copolymer are shown in Table 1.

Preparation of Composition

To the copolymer obtained as above was added Irganox® 1076 manufactured by Ciba-Geigy Limited, a calcium stearate and Sandostab® P-EPQ manufactured by Sand Corporation, and the resulting mixture was pelletized by melt extrusion.

General properties (GP) of the composition are shown in Table 1.

Production of Film

A 30 μm thickness of film was produced from the composition prepared in above by using an inflation molding machine, model EX-50 manufactured by Placo Corporation, equipped with a die having a diameter of 125 mm and a die lip of 2 mm, at a process temperature of 190° C., at a blow-up ratio of 1.8 and at a rate of extrusion of 25 kg/hr.

Film properties (FP) are shown in Table 1.

EXAMPLE 2

A polymerization was conducted in the same manner as in the polymerization of Example 1 except that 62 kg of butane as a solvent and 10 kg of butene-1 as an α-olefin were used and the hydrogen pressure was adjusted to 1.5 kg/cm$^2$. As the result of the polymerization, 9.6 kg of copolymer was obtained.

A composition from said copolymer was prepared in the same manner as Example 1.

A film was produced from the composition in the same manner as Example 1 except that a process temperature was adopted to 170° C.

Basic properties, general properties of the composition and film properties are shown in Tables 1 add 2.

Comparative Example 1

A film was produced from commercially available LLDPE, Sumikathene-L® FA101-1 manufactured by Sumitomo Chemical Co., Ltd., in the same manner as Example 1.

Basic properties, general properties and film properties of Sumikathene-L® FA101-0 are shown in Tables 1 and 2.

Comparative Example 2

A film was produced from commercially available LLDPE, Sumikathene-L® FA201-0 manufactured by Sumitomo Chemical Co., Ltd., in the same manner as Example 2

Basic properties, general properties and film properties of Sumikathene-L® FA201-0 are shown in Tables 1 and 2.

Comparative Example 3

From a blend of 80% by weight of Sumikathene-L® FA201-0 with 20% by weight of Sumikathene® F101-3, commercially available LDPE manufactured by Sumitomo Chemical Co., Ltd., a film was produced in the same manner as Example 1.

Basic properties, general properties and film properties of said blend are shown in Tables 1 and 2.

EXAMPLE 3

Synthesis of Titanium Compound (A1)

A 3 l flask equipped with a stirrer, dropping funnel and thermometer was purged with argon gas, and 181 ml (600 mmoles) of dioctylamine and 1.5 l of hexane were charged therein. Then, 387 ml (600 mmoles) of n-butyllithium diluted with hexane was added dropwise from the dropping funnel over a period of 30 minutes with stirring while keeping the temperature of the solution in the flask at 5° C. After completion of the addition, the reaction was further conducted at 5° C. for 2 hours and at 30° C. for 2 hours.

Then, 16.5 ml (150 mmoles) of $TiCl_4$ diluted with hexane was added dropwise from the dropping funnel to the liquid mixture obtained by the above reaction over a period of 30 minutes while keeping the temperature of the liquid mixture at 5° C. After completion of the addition, the reaction was further conducted at 5° C. for 1 hour and at 30° C. for 2 hours to obtain 150 mmoles of a titanium compound (A1) of the formula $[(C_8H_{17})_2N]_4Ti$.

Reaction of Titanium Compound (A1) with Organoaluminum Compound (A3)

To the titanium compound obtained as above was added 300 ml (300 mmoles) of triethylamluminum (TEA) diluted with heptane, and the resulting mixture was allowed to react for 1 hour while keeping the temperature at 30° C. to obtain 105 mmoles of a reaction product (A). (Catalyst concentration: 0.062 mmolTi/ml).

Polymerization

A copolymerization of an ethylene and a butene-1 was conducted under the following reaction condition in an autoclave type continuous reactor of inner volume equipped with a stirrer.

| Reaction Condition: | |
|---|---|
| Organoaluminum compound (B) | triethylaluminum (TEA) |
| Al/Ti (the atomic ratio) | 1.3 |
| Polymerization temp. | 210° C. |
| Polymerization pressure | 800 kg/cm$^2$ |
| Polymerization retention time | 45 sec. |
| Feed rate of ethylene | 7.11 kg/hr |
| Feed rate of butene-1 | 10.0 kg/hr |
| Feed rate of hydrogen | 4.4 g/hr |

As the result of the polymerization, 1.9 kg/hr of copolymer was obtained. Basic properties and general properties are shown in Table 3.

Comparative Example 4

The properties of Sumikathene-L® GA401-0, commercially available LLDPE manufactured by Sumitomo Chemical Co., Ltd., are shown in Table 3.

Comparative Example 5

The properties of Sumikathene® F200-0, commercially available LDPE manufactured by Sumitomo Chemical Co., Ltd., are shown in Table 3.

It should further be apparent to those skilled in the art that various changes in form and detail of the invention as shown and described may be made. It is intended that such changes be included within the spirit and scope of the claims appended hereto.

TABLE 1

| | | | Example 1 | Example 2 | Comparative Example 1 | Comparative Example 2 | Comparative Example 3 |
|---|---|---|---|---|---|---|---|
| B | ρ | g/cm$^3$ | 0.9147 | 0.9145 | 0.9198 | 0.9184 | 0.9194 |
| | CC | mol % | 4.5 | 4.6 | 3.2 | 3.7 | — |
| P | TVR | % | 47 | 58 | 11 | 8 | 9 |
| | TVN | | 0.35 | 0.45 | 0.13 | 0.11 | 0.12 |
| | Mw | | 112000 | 109000 | 118000 | 84000 | — |
| | Mw/Mn | | 3.7 | 3.2 | 3.9 | 4.0 | — |
| | Px | | 0.38 | 0.39 | 1.0 | 0.97 | — |
| | Cx | | 0.53 | 0.53 | 0.56 | 0.63 | — |
| G | MFR | g/10 min. | 1.1 | 2.0 | 0.81 | 2.0 | 1.4 |
| | SR | | 1.53 | 1.44 | 1.17 | 1.11 | 1.38 |
| P | FM | kg/cm$^2$ | 1200 | 1400 | 2000 | 1900 | 2000 |
| | TIS | kg · cm/cm$^2$ | 700 | 580 | 840 | 600 | 540 |
| | TS | kg/cm$^2$ | 260 | 230 | 310 | 240 | 250 |
| | MT | g | 6.1 | 3.1 | 4.5 | 1.9 | 10.1 |

TABLE 2

|   |   |   |   | Example 1 | Example 2 | Comparative Example 1 | Comparative Example 2 | Comparative Example 2 |
|---|---|---|---|---|---|---|---|---|
|   | Haze | % |   | 3.3 | 3.2 | 13.7 | 26 | 8.9 |
|   | Gloss | % |   | 130 | 130 | 70 | 40 | 80 |
| F | DIS | kg · cm/cm² |   | 260 | 250 | 230 | 150 | 140 |
|   | SM | kg/cm² | MD | 1400 | 1400 | 1600 | 1600 | 1900 |
|   |   |   | TD | 1900 | 1600 | 2000 | 1900 | 2700 |
| P | TS | kg/cm² | MD | 450 | 490 | 360 | 440 | 370 |
|   |   |   | TD | 290 | 350 | 230 | 310 | 320 |
|   | ET | kg/cm | MD | 8 | 15 | 25 | 28 | 10 |
|   |   |   | TD | 198 | 148 | 171 | 137 | 130 |

TABLE 3

|   |   |   | Example 3 | Comparative Exple 4 | Comparative Exple 5 |
|---|---|---|---|---|---|
|   | ρ | g/cm³ | 0.9359 | 0.9350 | 0.9235 |
|   | CC | mol % | 2.0 | 1.5 | — |
| B | TVN |   | 0.96 | 0.09 | 0.13 |
|   | TVR | % | 44 | 6 | 8 |
|   | Mw |   | 72000 | 81000 | — |
| P | Mw/Mn |   | 4.4 | 4.1 | — |
|   | Px |   | 0.44 | 1.04 | 0.11 |
|   | Cx |   | 0.58 | 0.52 | 0.33 |
|   | MFR | g/10 min. | 2.6 | 3.4 | 2.0 |
| G | SR |   | 1.60 | 1.18 | 1.42 |
|   | FM | kg/cm² | 4400 | 4000 | 2500 |
|   | TIS | kg · cm/cm² | 90 | 140 | 230 |
| P | TS | kg/cm² | 120 | 250 | 150 |
|   | MT | g | 5.3 | 1.1 | 9.0 |
|   | TRQ | g · m | 1300 | 1700 | 1300 |

What is claimed is:

1. An ethylene-α-olefin copolymer having:

(A) a density (ρ) of from 0.870 to 0.945 g/cm³, (B) a ratio (TVR) of trans-vinylene type carbon-carbon double bonds to total carbon-carbon double bonds as determined with an infrared absorption spectrum being 35% or more, (C) a weight average molecular weight (MW) of from $3.0 \times 10^4$ to $6.0 \times 10^5$, (D) a ratio (Mw/Mn) of a weight average molecular weight (Mw) to a number average molecular weight (Mn) being from 3 to 20, (E) a coefficient (Px) of moldability represented by the following formula (1) of from 0.05 to 0.60, $$Px = Mb/Mw \quad (1)$$

wherein Mb is an average molecular weight of fragments between branchings, and Mw is a weight average molecular weight, and (G) a swelling ratio (SR) of 1.25 or more.

2. An ethylene-α-olefin copolymer according to claim 1, wherein the copolymer further has;

(F) a coefficient (Cx) of variation of chemical composition distribution represented by the following formula (2) of from 0.40 to 0.80, $$Cx = \sigma/SCB_{ave} \quad (2)$$

wherein σ is a standard deviation of chemical composition distribution (1/1000 C), and $SCB_{ave}$ is an average of the number of short chain branchings per 1000 C (1/1000 C).

3. An ethylene-α-olefin copolymer according to claim 1, wherein (E) the coefficient (Px) of moldability represented by the formula (1) is from 0.10 to 0.50.

4. An ethylene-α-olefin copolymer according to claim 1, wherein (G) the swelling ratio (SR) is 1.35 or more.

5. An ethylene-α-olefin copolymer according to claim 1, wherein (G) the swelling ratio (SR) is 1.45 or more.

6. An ethylene-α-olefin copolymer according to claim 1, wherein (B) the ratio (TVR) is 40% or more.

7. An ethylene-α-olefin copolymer according to claim 1, wherein (E) the coefficient (Px) of moldability represented by the formula (1) is from 0.15 to 0.45.

8. An ethylene-α-olefin copolymer according to claim 1, wherein the copolymer further has (H) a melt flow rate (MFR) of from 0.01 to 9 g/10 min.

9. A molded article comprising the ethylene-α-olefin copolymer according to claim 1.

10. An ethylene-α-olefin copolymer according to claim 2, wherein (F) the coefficient (Cx) of variation of chemical composition distribution represented by the formula (2) is from 0.45 to 0.75.

11. An ethylene-α-olefin copolymer according to claim 2, wherein (F) the coefficient (Cx) of variation of chemical composition distribution represented by the formula (2) is from 0.45 to 0.70.

12. A molded article comprising the ethylene-α-olefin copolymer according to claim 2.

13. A molded article comprising the ethylene-α-olefin copolymer according to claim 3.

14. A molded article comprising the ethylene-α-olefin copolymer according to claim 4.

15. A molded article comprising the ethylene-α-olefin copolymer according to claim 5.

16. A molded article comprising the ethylene-α-olefin copolymer according to claim 6.

17. A molded article comprising the ethylene-α-olefin copolymer according to claim 7.

18. A molded article comprising the ethylene-α-olefin copolymer according to claim 8.

19. A molded article according to claim 9, wherein the molded article is a film.

20. A molded article comprising the ethylene-α-olefin copolymer according to claim 10.

21. A molded article comprising the ethylene-α-olefin copolymer according to claim 11.

* * * * *